United States Patent

Burns et al.

[11] Patent Number: 5,807,501
[45] Date of Patent: Sep. 15, 1998

[54] NEUTRAL-AGED HYDROPHOBIC ORGANOSILICATE-MODIFIED SILICA GELS

[75] Inventors: Gary Thomas Burns; Qin Deng; James Richard Hahn; Clifford Carlton Reese, all of Midland, Mich.

[73] Assignee: Dow Corning Corporation, Midland, Mich.

[21] Appl. No.: 801,410

[22] Filed: Feb. 20, 1997

[51] Int. Cl.$^6$ .............................. B01J 13/00; C04B 14/04
[52] U.S. Cl. .................. 252/315.2; 106/490; 252/62; 252/314; 427/219; 428/405; 501/12
[58] Field of Search ................... 252/315.2; 427/219; 428/405; 501/12; 106/490

[56] References Cited

U.S. PATENT DOCUMENTS

| | | |
|---|---|---|
| 2,802,850 | 8/1957 | Wetzel ............................ 252/315.2 X |
| 2,892,797 | 2/1959 | Alexander et al. ................. 252/313.2 |
| 3,015,645 | 1/1962 | Tyler ..................................... 528/12 |
| 3,024,126 | 3/1962 | Brown ................................. 106/490 |
| 3,122,520 | 2/1964 | Lentz .................................. 106/490 |
| 3,677,784 | 7/1972 | Nitzsche et al. ................. 106/490 X |
| 3,850,971 | 11/1974 | Termin et al. ....................... 556/457 |
| 3,979,546 | 9/1976 | Lewis ................................... 428/394 |
| 4,006,175 | 2/1977 | Termin et al. ......................... 556/10 |
| 4,344,800 | 8/1982 | Lutz ................................ 106/490 X |
| 4,360,388 | 11/1982 | Nauroth et al. ...................... 106/482 |
| 4,985,477 | 1/1991 | Collins et al. .................. 106/490 X |
| 5,364,697 | 11/1994 | Miyabayashi ................... 428/405 X |

FOREIGN PATENT DOCUMENTS

| | | |
|---|---|---|
| 0 658 513 A1 | 6/1995 | Germany . |
| 0 690 023 A2 | 6/1995 | Germany . |

OTHER PUBLICATIONS

Brunauer Emmett and Teller, Jour. Am.. Chem. Soc., 60:309 (1938).

*Primary Examiner*—Richard D. Lovering
*Attorney, Agent, or Firm*—William F. Boley

[57] ABSTRACT

The present invention is neutral-aged hydrophobic organosilicate-modified silica gels and a method for their preparation. The method comprises three steps, where in the first step an organosilicate-modified silica hydrosol is contacted with a strong mineral acid at a pH less than about 1 to form an organosilicate-modified silica hydrogel. In the second step the organosilicate-modified silica hydrogel is aged at a pH within a range of about pH 3.5 to pH 8. In the third step the neutral-aged organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica hydrogel having a surface area within a range of about 100 $m^2/g$ to 750 $m^2/g$ in the dry state. In a preferred process the hydrophobic organosilicate-modified silica hydrogel is contacted with a sufficient quantity of a water-immiscible organic solvent to convert the hydrophobic organosilicate-modified silica hydrogel into a hydrophobic organosilicate-modified silica organogel.

20 Claims, No Drawings

NEUTRAL-AGED HYDROPHOBIC ORGANOSILICATE-MODIFIED SILICA GELS

BACKGROUND OF INVENTION

The present invention is neutral-aged hydrophobic organosilicate-modified silica gels and a method for their preparation. The method comprises three steps, where in the first step an organosilicate-modified silica hydrosol is contacted with a strong mineral acid at a pH less than about 1 to form an organosilicate-modified silica hydrogel. In the second step the organosilicate-modified silica hydrogel is aged at a pH within a range of about pH 3.5 to pH 8. In the third step the neutral-aged organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica hydrogel having a surface area within a range of about 100 $m^2/g$ to 750 $m^2/g$ in the dry state. In a preferred process the hydrophobic organosilicate-modified silica hydrogel is contacted with a sufficient quantity of a water-immiscible organic solvent to convert the hydrophobic organosilicate-modified silica hydrogel into a hydrophobic organosilicate-modified silica organogel. The organic solvent can then be removed from the organogel to form a hydrophobic organosilicate-modified silica gel having a surface area within a range of about 100 $m^2/g$ to 750 $m^2/g$ in the dry state. A water soluble compound of cerium or iron may be added in the third step to improve the heat stability of the hydrophobic organosilicate-modified silica gel.

Although hydrophobic organosilicate-modified silica gels prepared by the present method are useful in many applications such as thermal insulation, reinforcing and extending filler in natural rubbers, and as filler in floatation devices, they are particularly useful as reinforcing fillers in silicone rubber compositions. It is well known that silicone rubbers formed from the vulcanization of polydiorganosiloxane fluids or gums alone generally have low elongation and tensile strength values. One means for improving the physical properties of such silicone rubbers involves the incorporation of a reinforcing silica filler into the fluid or gum prior to curing. However, silica reinforcing fillers have a tendency to interact with the polydiorganosiloxane fluid or gum causing a phenomenon typically referred to as "crepe hardening." A great deal of effort has been made in the past to treat the surface of reinforcing silica fillers with organosilanes or organosiloxanes to make the surface of the silica hydrophobic. This surface treatment reduces or diminishes the tendency of the compositions to crepe harden and improves the physical properties of the cured silicone rubber.

Brown, U.S. Pat. No. 3,024,126, teaches a method for making a pre-formed reinforcing silica filler hydrophobic by treating it in an organic solvent with an organosilicon compound, such as an organosilane or low-molecular weight organosiloxane containing 0.1 to 2 total hydroxyl and/or alkoxy radicals per silicon atom, and a small amount of amine, quaternary ammonium, or organometallic compound.

Lewis, U.S. Pat. No. 3,979,546, teaches a method for making the surface of reinforcing silica fillers hydrophobic through the use of alpha-alkoxy-omega-siloxanols with alcohols under mild conditions. The fillers taught are pre-formed solids.

Tyler, U.S. Pat. No. 3,015,645, teaches the making of hydrophobic silica powders by reacting an organosilicon compound such as dimethyldichlorosilane or trimethylmethoxysilane with an silica organogel in the presence of an acidic catalyst and then removing the volatile materials. The method requires the preparation of a silica hydrogel which is converted to a silica organogel by replacing the water in the silica hydrogel with an organic solvent.

Lentz, U.S. Pat. No. 3,122,520, teaches a procedure where an acidic silica hydrosol is first heated to develop a reinforcing silica structure and then mixed with an organosilicon compound, an acid catalyst, and a water-immiscible organic solvent to produce a hydrophobic silica filler. The organosilicon compounds taught by Lentz are limited to those compounds in which the organic radicals bonded to silicon atoms have less than 6 carbon atoms, organosilicon compounds having no organofunctional substituents bonded to silicon atoms, and to organosilicon compounds having no hydrogen bonded to silicon atoms.

Alexander et al., U.S. Pat. No. 2,892,797, describe silica sols modified by treatment with a solution of a metalate so that the silica particles are coated with no more than a molecular layer of a combined metal which forms an insoluble silicate at a pH between 5 and 12. Aluminum, tin, zinc, and lead are taught as the preferred metals. Alexander et al. teach that silica sols which carry a metal upon the surface of the particles according to their invention have increased stability at pH extremes.

Termin et al., U.S. Pat. Nos. 3,850,971, and 4,006,175 teach that porous silicic acid having a specific surface area of about 50 $m^2/g$ to 1000 $m^2/g$ can be made by hydrolyzing methyl or ethyl silicate or polymethyl or polyethyl silicate with about 70 to 120% of the stoichiometric amount of water with moderate stirring. Termin et al. teach that transition metals such as iron oxides and chromium oxides may be used as hydrolysis activators and that such metals may appear in the end product.

Nauroth et al., U.S. Pat. No. 4,360,388, teach cerium containing precipitated silica. Nauroth et al. teach that silicone rubber compositions reinforced with the cerium containing precipitated silica exhibit excellent heat stability and that the cerium containing precipitated silica acts as a fire retardant agent.

Jensen et al., EP 0-690-023 A2, teach the aging of silica gels at a pH of 4 to 11 prior to a hydrophobing step. The described silica gels are not organosilicate modified.

Jensen et al., EP 0-658,531 A1, teach the aging of silica gels at a pH of 6 to 11 prior to a hydrophobing step. The described silica gels are not organosilicate modified.

The hydrophobic organosilicate-modified silica gels prepared by the present method have improved hydrophobicity when compared to hydrophobic silica gels prepared without the presence of the organosilicate. The improved hydrophobicity can make the hydrophobic organosilicate-modified silica gels more compatible with organic rubber and silicone rubber compositions. The hydrophobic organosilicate-modified silica gels also have a lower refractive index, which makes them desirable for use in silicone rubber compositions requiring optical clarity.

SUMMARY OF INVENTION

The present invention is neutral-aged hydrophobic organosilicate-modified silica gels and a method for their preparation. The method comprises three steps, where in the first step an organosilicate-modified silica hydrosol is contacted with a strong mineral acid at a pH less than about 1 to form an organosilicate-modified silica hydrogel. In the second step the organosilicate-modified silica hydrogel is aged at a pH within a range of about pH 3.5 to pH 8. In the third step the neutral-aged organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica hydrogel having a surface area within a range of about 100 m²/g to 750 m²/g in the dry state. In a preferred process the hydrophobic organosilicate-modified silica hydrogel is contacted with a sufficient quantity of a water-immiscible organic solvent to convert the hydrophobic organosilicate-modified silica hydrogel into a hydrophobic organosilicate-modified silica organogel. The organic solvent can be removed from the hydrophobic organosilicate-modified silica organogel to form a hydrophobic organosilicate-modified silica gel having a surface area within a range of about 100 m²/g to 750 m²/g in the dry state.

DESCRIPTION OF INVENTION

The present invention is neutral-aged hydrophobic organosilicate-modified silica gels and a method for their preparation. The method for preparing the neutral-aged hydrophobic organosilicate-modified silica gels comprises:

(A) contacting an organosilicate-modified silica hydrosol comprising (i) about 2 to 50 weight percent of $SiO_2$ per milliliter and (ii) about 1 to 50 weight percent of an organosilicate described by formula $R^1SiO_{3/2}$, where $R^1$ is a monovalent hydrocarbon radical comprising about 1 to 6 carbon atoms, with a strong mineral acid at a pH less than about 1 and at a temperature within a range of about 20° C. to 250° C. to form an organosilicate-modified silica hydrogel, (B) aging the organosilicate-modified silica hydrogel at a pH within a range of about pH 3.5 to pH 8, and (C) mixing the organosilicate-modified silica hydrogel with (1) a catalytic amount of a strong acid and (2) an organosilicon compound selected from the group consisting of organosilanes described by formula

$$R^2_aH_bSiX_{4-a-b} \quad (1)$$

and organosiloxanes described by formula

$$R^2_nSiO_{(4-n)/2}, \quad (2)$$

where each $R^2$ is independently selected from a group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising about 1 to 12 carbon atoms, a=0, 1, 2, or 3, b=0 or 1, a+b=1, 2, or 3 with the proviso that when b=1 then a+b=2 or 3, and n is an integer of from 2 to 3 inclusive to form a hydrophobic organosilicate-modified silica hydrogel having a surface area within a range of about 100 m²/g to 750 m²/g as measured in the dry state.

The method of the present invention is a three-step procedure, comprising steps (A), (B), and (C), for making hydrophobic organosilicate-modified silica gels. Step (A) of the method comprises heating an organosilicate-modified silica hydrosol under strong acid conditions to form an organosilicate-modified silica hydrogel. Step (B) comprises aging the organosilicate-modified silica hydrogel prepared in step (A) at a pH within a range of about pH 3.5 to pH 8. Step (C) comprises mixing the neutral-aged organosilicate-modified silica hydrogel prepared in step (B) with an organosilicon compound which reacts with the organosilicate-modified silica hydrogel to give a hydrophobic organosilicate-modified silica hydrogel. In a preferred method the hydrophobic organosilicate-modified silica hydrogel is further contacted with a sufficient amount of water-immiscible organic solvent to convert the hydrophobic organosilicate-modified silica hydrogel to a hydrophobic organosilicate-modified silica organogel. The water-immiscible organic solvent can them be removed from the hydrophobic organosilicate-modified silica organogel to form a hydrophobic organosilicate-modified gel. Hydrophobic organosilicate-modified silica gels prepared by the present method are useful as reinforcing fillers in, for example, silicone rubber and organic rubber compositions.

The method used to prepare the organosilicate-modified silica hydrosol is not critical and can be any of those known in the art. The organosilicate-modified silica hydrosol may be prepared, for example, by first preparing a silica hydrosol and then mixing the silica hydrosol with an organosilicate as described herein and acidifying the mixture. The organosilicate-modified silica hydrosol may be prepared, for example, by mixing a silica hydrosol with an acidified organosilicate. The organosilicate-modified silica hydrosol may be prepared by forming a mixture of sodium silicate and the organosilicate and acidifying the mixture. Silica hydrosols useful for preparing the organosilicate-modified silica hydrosol can be prepared by, for example, deionizing sodium silicate by a method such as the use of an ion exchange resin. The silica hydrosol may be prepared by hydrolyzing a silane at a low temperature. The silica hydrosol may be prepared by acidifying a sodium silicate mixture.

Organosilicates useful in the present method are described by formula $R^1SiO_{3/2}$, where $R^1$ is a monovalent hydrocarbon radical comprising about 1 to 6 carbon atoms. $R^1$ can be, for example, alkyls such as methyl, ethyl, and hexyl; substituted alkyls such as 3,3,3-trifluoropropyl and chloromethyl; alkenyls such as vinyl, allyl, and hexenyl; and aryls such as phenyl.

The organosilicate-modified silica hydrosol requires the presence of about 2 to 50 weight percent of $SiO_2$ per milliliter (ml) of the hydrosol. Preferred is when the organosilicate-modified silica hydrosol comprises about 5 to 20 weight percent of $SiO_2$ per ml of the hydrosol. The organosilicate-modified silica hydrosol also requires the presence of about 1 to 50 weight percent of an organosilicate described by formula $R^1SiO_{3/2}$, where $R^1$ is as described above, per ml of the hydrosol. Preferred is when the organosilicate-modified silica hydrosol comprises about 1 to 20 weight percent of the organosilicate per ml of the hydrosol.

In step (A), the organosilicate-modified silica hydrosol must be contacted with a sufficient concentration of a strong mineral acid such that the pH of the organosilicate-modified silica hydrosol is less than about pH 1. Preferably, there should be a sufficient amount of the strong mineral acid present so that the pH is essentially 0, that is so that the pH cannot be measured. For the purpose of this invention any strong mineral acid can be used. As used herein, the term "strong mineral acid" refers to those acids which ionize to the extent of at least 25 percent in 0.1N aqueous solution at 18° C. The strong mineral acid may be, for example, hydrochloric, hydroiodic, sulfuric, nitric, and phosphoric acid.

In step (A), the organosilicate-modified silica hydrosol is contacted with the strong mineral acid at a temperature within a range of about 20° C. to 250° C. Preferred is when the organosilicate-modified silica hydrosol is contacted with the strong mineral acid at a temperature within a range of about 20° C. to 80° C. Even more preferred is when, in step (A), the organosilicate-modified silica hydrosol is contacted with the strong mineral acid at a temperature within a range of about 20° C. to 50° C.

In step (A), the contacting time required varies with the temperature and acid concentration. Generally the higher the temperature and the greater the acid concentration the shorter the contact time needed. The contacting of step (A) must be continued until the organosilicate-modified silica hydrogel acquires a structure such that the final product after hydrophobing has a surface area in the dry state within a range of about 100 $m^2$/g to 750 $m^2$/g as determined by the Brunauer Emmett and Teller (BET) method described in the Jour. Am. Chem. Soc. 60:309 (1938) and as further described in Lentz, U.S. Pat. No. 3,122,520, which is hereby incorporated by reference for such a teaching. The surface area of the organosilicate-modified silica hydrogel at the conclusion of step (A) is immaterial provided it is such that the surface area of the dried product after the hydrophobing of step (C) is within the above described range. Generally the surface area of the organosilicate-modified silica hydrogel is reduced by the hydrophobing reaction, since the organosilyl groups which become attached to the surface of the organosilicate-modified silica hydrogel increase the average particle size. The surface of the organosilicate-modified silica hydrogel can be above 750 $m^2$/g provided that the hydrophobing treatment brings it within a range of about 100 $m^2$/g to 750 $m^2$/g.

To determine the proper contact conditions during conduct of step (A) it is necessary to proceed with step (B) and the hydrophobing of step (C) and then measure the surface area of the resulting product in the dry state. If the surface area of the resulting product in the dry state is above 750 $m^2$/g, then the contacting conditions of step (A) were too mild. If the surface area of the resulting product in the dry state is below 100 $m^2$/g, then the contacting conditions of step (A) were too severe. Examples of suitable acid concentrations, temperatures, and times for conduct of step (A) are provided in the Examples herein. If the surface area of the hydrophobic organosilicate-modified silica gel in the dry state is above or below the described range, the hydrophobic organosilicate-modified silica gels have diminished reinforcing properties in silicone elastomers.

In step (B) of the present method, the organosilicate-modified silica hydrogel of step (A) is aged at a pH within a range of about pH 3.5 to pH 8. Preferred is when the organosilicate-modified silica hydrogel is aged at a pH within a range of about pH 6 to pH 7.5. The pH of the organosilicate-modified silica hydrogel can be adjusted to within the described ranges by use of a base such as $NH_4OH$, NaOH, KOH, and $Na_2O(SiO_2)_{3.36}$. Preferred is when the organosilicate-modified silica hydrogel of step (A) is first washed with deionized water to remove electrolytes provided by the strong mineral acid, then the pH is adjusted to within the described ranges. Generally, the organosilicate-modified silica hydrogel can be aged at a temperature within a range of about 0° C. to 250° C. It is preferred that the organosilicate-modified silica hydrogel be aged at a temperature within a range of about 20° C. to 150° C. Most preferred is when the organosilicate-modified silica hydrogel is aged at a temperature within a range of about 20° C. to 80° C. The length of time for aging the organosilicate-modified silica hydrogel can be from about 10 minutes to 76 hours or longer. A preferred length of time for aging the organosilicate-modified silica hydrogel is within a range of about 1 hour to 24 hours.

If desired, the organosilicate-modified silica hydrogel of step (B) may be subjected to a shearing force to reduce aggregate particle size and create a more uniform particle size distribution prior to the conduct of the hydrophobing reaction of step (C). The shearing force may be applied to the organosilicate-modified silica hydrogel by any of those methods known in the art. The shearing force may be applied, for example, by a mechanical means such as a high-speed mixer or by ultrasound. This reduction in aggregate particle size and improved uniformity of particle size can provide for hydrophobic organosilicate-modified silica gels which when compounded into silicone elastomer compositions provide for lower viscosity compositions, more stable compositions, and for cured silicone elastomers having improved clarity and physical properties.

In step (C) of the present method the neutral-aged organosilicate-modified silica hydrogel of step (B) is mixed with one or more of the defined organosilicon compounds described by formulas (1) and (2) in the presence of a catalytic amount of a strong acid. In step (C), the strong acid can be the same acid which was used in step (A). The catalytic amount of strong acid can be added either prior to, simultaneously with, or subsequent to the addition of the organosilicon compound. In the case where the organosilicon compound is, for example, a chlorosilane, the catalytic amount of the strong acid can be generated in situ by hydrolysis of the chlorosilane or the reaction of the chlorosilane directly with hydroxyls of the organosilicate-modified silica hydrogel. In step (C) the limitations on pH as described for step (A) do not apply. It is only necessary that a catalytic amount of a strong acid be present in an amount sufficient to effect reaction of the organosilicon compound with the organosilicate-modified silica hydrogel. Examples of useful acids include hydrochloric, sulfuric, and benzene sulfonic acids. It is preferred that in step (C) the strong acid catalyst provide a pH less than about 2.5.

The temperature at which the hydrophobing of step (C) is conducted is not critical and can be from about 20° C. to 250° C. Generally it is preferred that the hydrophobing of step (C) be conducted at a temperature within a range of about 30° C. to 150° C. The hydrophobing of step (C) can be conducted at the reflux temperature of the water-immiscible organic solvent when it is present.

In step (C), the organosilicate-modified silica hydrogel of step (B) is reacted with an organosilicon compound described by formulas (1) and (2). In formulas (1) and (2), each $R^2$ can be independently selected from a group consisting of hydrocarbon radicals comprising about 1 to 12 carbon atoms and organofunctional hydrocarbon radicals comprising about 1 to 12 carbon atoms. $R^2$ can be a saturated or unsaturated hydrocarbon radical. $R^2$ can be a substituted or non-substituted hydrocarbon radical. $R^2$ can be, for example, alkyl radicals such as methyl, ethyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^2$ can be an organofunctional hydrocarbon radical comprising about 1 to 12 carbon atoms where, for example, the functionality is mercapto, disulfide, polysulfide, amino, carboxylic acid, carbinol, ester, or amido. A preferred organofunctional hydrocarbon radical is one having disulfide or polysulfide functionality.

In formula (1) each X is independently selected from a group consisting of halogen and alkoxy radicals comprising about 1 to 12 carbon atoms. When X is a halogen, it is preferred that the halogen be chlorine. When X is an alkoxy radical, X may be, for example, methoxy, ethoxy, and propoxy. Preferred is where each X is selected from a group consisting of chlorine atoms and methoxy.

The viscosity of the organosiloxanes described by formula (2) is not limiting and can range from that of a fluid to a gum. Generally, higher molecular weight organosiloxanes will be cleaved by the acidic conditions of the present method allowing them to react with the organosilicate-modified silica hydrogel.

The organosilicon compound may be provided to the present method as a single compound as described by formula (1) or (2) or as a mixture of two or more organosilicon compounds described by formulas (1) and (2).

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, and bis{3-(triethoxysilyl)propyl}tetrasulfide. When the hydrophobic organosilicate-modified silica gel is to be used as a filler in a silicone rubber, it is preferred that the organosilicon compound be hexamethyldisiloxane or dimethyldichlorosilane.

The amount of organosilicon compound added to the method is that sufficient to adequately hydrophobe the organosilicate-modified silica hydrogel to provide a hydrophobic organosilicate-modified silica gel suitable for its intended use. Generally the organosilicon compound should be added to the method in an amount such that there is at least 0.04 organosilyl unit per $SiO_2$ unit in the organosilicate-modified silica hydrogel. The upper limit of the amount of organosilicon compound added to the process is not critical since any amount in excess of the amount required to saturate the organosilicate-modified silica gel will act as a solvent for the method.

The hydrophobic organosilicate-modified silica hydrogel of step (C) may be used as is or may be recovered for use by such methods as centrifugation or filtration. The hydrophobic organosilicate-modified silica hydrogel may be dried by the use of such methods as heating or reducing pressure or a combination of both heating and reduced pressure.

In a preferred method a water-immiscible organic solvent in sufficient amount to convert the organosilicate-modified silica hydrogel or hydrophobic organosilicate-modified silica hydrogel to the corresponding organogel is added to the method. The solvent can be added prior to, simultaneously with, or subsequent to the addition of the organosilicon compound. That is, the organosilicate-modified silica hydrogel can be first converted into an organogel by replacement of the water with the organic solvent and then hydrophobed. On the other hand, the organosilicon compound and the organic solvent can be added simultaneously to the organosilicate-modified silica hydrogel. Under these conditions the reaction of the organosilicate-modified silica hydrogel with the organosilicon compound and the replacement of the water in the hydrophobic organosilicate-modified silica hydrogel with the organic solvent may occur simultaneously. Finally the organosilicon compound can be added prior to the organic solvent, in which case the organosilicate-modified silica hydrogel reacts with the organosilicon compound and the resulting product is then converted into an organogel by an addition of an organic solvent. In the latter two cases, the conversion to an organogel is accomplished by a phase separation in which the hydrophobic organosilicate-modified silica gel passes into the water-immiscible organic solvent phase. A preferred method is where a water-immiscible organic solvent is added after the formation of the hydrophobic organosilicate-modified silica hydrogel thereby effecting formation of a hydrophobic organosilicate-modified silica organogel.

For purpose of this invention any organic solvent immiscible with water can be employed. Suitable solvents include low molecular weight siloxanes such as hexamethyldisiloxane, octamethylcyclotetrasiloxane, diphenyltetramethyldisiloxane and trimethylsilyl endblocked dimethylpolysiloxane fluids. When a siloxane is employed as a solvent it may serve both as a solvent and as a reactant with the organosilicate-modified silica hydrogel. In addition, suitable solvents include aromatic hydrocarbons such as toluene and xylene; heptane and other aliphatic hydrocarbon solvents; cycloalkanes such as cyclohexane; ethers such as diethylether and dibutylether; halohydrocarbon solvents such as methylene chloride, chloroform, ethylene chloride, and chlorobenzene; and ketones such as methylisobutylketone.

The amount of water-immiscible organic solvent is not critical so long as there is sufficient solvent to convert the hydrophobic organosilicate-modified silica hydrogel into a silica organogel. Preferably the solvent should have a boiling point below about 250° C. to facilitate its removal from the hydrophobic organosilicate-modified silica organogel, however the boiling point is not critical since the solvent may be removed from the hydrophobic organosilicate-modified silica organogel by centrifuging, evaporation, or other suitable means.

After the organosilicate-modified silica hydrogel has been converted to the hydrophobic organosilicate-modified silica organogel the resulting product may be employed per se. That is the hydrophobic organosilicate-modified silica organogel may be used directly as a reinforcing agent in silicone rubber or in any other uses for which this type of product can be used. Alternatively, the solvent may be removed from the hydrophobic organosilicate-modified silica organogel and the resulting dry hydrophobic organosilicate-modified silica gel used.

During the conduct of step (C) it may by desirable to add a surfactant or water immiscible solvent to facilitate the reaction of the organosilicon compound with the organosilicate-modified silica hydrogel. The surfactant or water-miscible solvent may be added in the presence or absence of any water-immiscible organic solvent added to the method. Suitable surfactants may include, for example, anionic surfactants such as dodecylbenzene sulfonic acid, nonionic surfactants such as polyoxyethylene(23)lauryl ether and $(Me_3SiO)_2MeSi(CH_2)_3(OCH_2CH_2)_7OMe$ where Me is methyl, and cationic surfactants such as N-alkyltrimethyl ammonium chloride. Suitable water-miscible solvents include, for example, alcohols such as ethanol, propanol, isopropanol, and tetrahydrofuran.

In step (C) of the present method an effective amount of a heat stabilizing agent selected from a group consisting of water soluble compounds of cerium and iron may be added. By the term "effective amount" it is meant that the water soluble compound of cerium or iron is present in the hydrophobic organosilicate-modified silica gel at a concentration sufficient to provide improved heat stability to those compositions in which the hydrophobic organosilicate-modified silica gel is incorporated. Such compositions can include, for example, silicone rubber, natural rubber, and synthetic organic rubber.

Generally, about 0.01 percent weight/volume (% Wt./Vol.) to 10% Wt./Vol. of the water soluble compound of cerium or iron in relation to the volume of components in step (C), excluding solvents, is considered useful in the present process. Preferred is where the water soluble compound of cerium or iron comprises about 0.1% Wt./Vol. to 1% Wt./Vol. on the same basis.

Examples of water soluble compounds which may be useful in the present method include $FeCl_3$, $FeBr_2$, $FeBr_3.6H_2O$, $FeCl_2.4H_2O$, $FeI_2.4H_2O$, $Fe(NO_3)_3.6H_2O$, $FePO_4.2H_2O$, $CeCl_3.9H_2O$, $CeBr_3.H_2O$, $CeI_3.9H_2O$, $Ce(NO_3)_3.6H_2O$, and $Ce(SO_4)_2.2H_2O$. A preferred water soluble compound of cerium and iron for use in the present method is selected from the group consisting of $FeCl_3$ and $CeCl_3.9H_2O$.

The following examples are provided to illustrate the present invention. These examples are not intended to limit the scope of the present claims.

EXAMPLE 1

An organosilicate-modified silica gel aged at pH 6.8, hydrophobed with hexamethyldisiloxane, and having incorporated therein $FeCl_3$ as a heat stabilizing agent was prepared. A solution was prepared comprising 312 ml of PQ N Clear Sodium Silicate (PQ Corporation, Valley Forge, Pa.), 140 ml of sodium methyl silicate (DC® 722, Dow Corning Corporation, Midland, Mich.), and 948 ml of deionized water. This solution was added to a rapidly stirred solution comprising 300 ml of concentrated HCl (Fisher Certified, Fisher Scientific, Fair Lawn, N.J.) diluted with 300 ml of deionized water to form an organosilicate modified silica hydrosol comprising 0.063 g of $SiO_2$/ml and 0.017 g of $MeSiO_{3/2}$/ml (Me represents a methyl group). After stirring for an additional 2 to 3 minutes, the organosilicate-modified silica hydrosol was poured into flat pans and allowed to gel for about 2.5 hours. The organosilicate-modified silica hydrogel was cut into 2.5 cm squares and washed with deionized water until the pH of the effluent was between pH 3 and pH 4. The washed organosilicate-modified silica hydrogel was placed in a glass container, adjusted to about pH 6.8 by the addition of concentrated ammonium hydroxide, and the resulting mixture aged 44 hours at room temperature.

After neutral aging, the water phase was drained from the organosilicate-modified silica gel and the gel placed in a 5 L glass flask. To the organosilicate-modified silica hydrogel, with stirring, was added 727 ml of concentrated HCl (Fisher Certified), 909 ml of isopropanol, 471 ml of hexamethyldisiloxane, and 4.2 g of $FeCl_3$. After stirring the flask content 1 hour at room temperature, 2 L of toluene were added. After stirring the flask content for an additional 2 to 3 minutes, stirring was stopped and the aqueous phase drained from the flask. The toluene phase was washed with 1 L of deionized water. The flask was fitted with a Dean-Stark trap and the toluene phase refluxed to remove residual water. The toluene phase was evaporated under reduced pressure leaving as product a hydrophobic organosilicate-modified silica gel. The organosilicate-modified hydrophobic silica gel was dried for 14 hours at 150° C. The yield of dried hydrophobic organosilicate-modified silica gel was 171 g. The BET surface area of the dried hydrophobic organosilicate-modified silica gel was determined by the method described supra; void volume, pore volume, average pore diameter, and particle size were characterized by standard methods; and carbon content was determined by CHN analysis using a Perkin Elmer Model 2400 CHN Elemental Analyzer (Perkin Elmer Corporation, Norwalk, Conn.). The result of these analysis are reported in Table 1.

EXAMPLE 2

An organosilicate-modified silica gel aged at pH 6.8, hydrophobed with dimethyldichlorosilane, and having incorporated therein $FeCl_3$ as a heat stabilizing agent was prepared. A solution was prepared comprising 312 ml of PQ N Clear Sodium Silicate (PQ Corporation), 140 ml of sodium methyl silicate (DC 722) and 948 ml of deionized water. This solution was added to a rapidly stirred solution comprising 300 ml of concentrated HCl (Fisher Certified) diluted with 300 ml of deionized water to form an organosilicate-modified silica hydrosol comprising 0.063 g of $SiO_2$/ml and 0.017 g $MeSiO_{3/2}$/ml (Me represents a methyl group). After stirring for an additional 2 to 3 minutes, the organosilicate-modified silica hydrosol was poured into flat pans and allowed to gel for about 2 hours. The organosilicate-modified silica hydrogel was cut into 2.5 cm squares and washed with deionized water until the pH of the effluent was between pH 3 and pH 4. The washed organosilicate-modified silica hydrogel was placed in a glass container, adjusted to about pH 6.8 by the addition of concentrated ammonium hydroxide, and the resulting mixture aged 44 hours at room temperature.

After neutral aging, the water phase was drained from the organosilicate-modified silica gel and the gel placed in a 5 L glass flask. To the organosilicate-modified silica hydrogel, with stirring, was added 727 ml of concentrated HCl (Fisher Certified), 909 ml of isopropanol, 130 ml of dimethyldichlorosilane, and 4.2 g of $FeCl_3$. After stirring the flask content 1 hour at room temperature, 2 L of toluene were added to the flask. After stirring the flask content for an additional 2 to 3 minutes, stirring was stopped and the aqueous phase drained from the flask. The toluene phase was washed with 1 L of deionized water. The flask was fitted with a Dean-Stark trap and the toluene phase refluxed to remove residual water. The toluene phase was evaporated under reduced pressure leaving as product a hydrophobic organosilicate-modified silica gel. The organosilicate-modified hydrophobic silica gel was dried 14 hours at 150° C. The yield of dried hydrophobic organosilicate-modified silica gel was 179 g. Physical properties of the dried hydrophobic organosilicate-modified silica gel were determined by the methods described in Example 1 and the results are reported in Table 1.

EXAMPLE 3

An organosilicate-modified silica gel aged at pH 6.8 and hydrophobed with hexamethyldisiloxane was prepared. The neutral-aged organosilicate-modified silica gel was sheared prior to hydrophobing to reduce aggregate particle size and improve the uniformity of the particle size distribution. A solution was prepared comprising 156 ml of PQ N Clear Sodium silicate (PQ Corporation), 70 ml of sodium methyl silicate (DC 722), and 474 ml of deionized water. This solution was added to a rapidly stirred solution comprising 150 ml of concentrated HCl (Fisher Certified) diluted with 150 ml of deionized water to form an organosilicate-modified silica hydrosol comprising 0.063 g of $SiO_2$/ml and 0.017 g of $MeSiO_{3/2}$/ml (Me represents a methyl group). After stirring for an additional 2 to 3 minutes, the organosilicate-modified silica hydrosol was poured into flat pans and allowed to gel for about 2 hours. The resulting organosilicate-modified silica hydrogel was cut into 2.5 cm squares and washed with deionized water until the pH of the effluent was about pH 2.2. The washed organosilicate-modified silica hydrogel was placed in a glass container, adjusted to about pH 6.8 by the addition of concentrated ammonium hydroxide, and the resulting mixture aged 44 hours at room temperature.

After neutral aging the organosilicate-modified silica hydrogel the water phase was drained-off and 364 ml of concentrated HCl (Fisher Certified) added. The acidified organosilicate-modified silica hydrogel was placed in a Waring Blender (Model 7011, Waring Products Division of Dynamics Corporation of America, New Hartford, Conn.) and the organosilicate-modified silica hydrogel sheared for two minutes. The sheared organosilicate-modified silica hydrogel was then placed in a 5 L glass flask and, with stirring, was added 909 ml of isopropanol and 115 ml of hexamethyldisiloxane. After stirring the flask content for 1 hour at room temperature, 1.3 L of toluene were added to the flask. After stirring the flask content for an additional 2 to 3 minutes, stirring was stopped and the aqueous phase drained from the flask. The toluene phase was washed with 0.5 L of deionized water. The flask was fitted with a Dean-Stark trap and the toluene phase refluxed to remove residual water. The toluene phase was evaporated under reduced pressure leaving as product a hydrophobic organosilicate-modified silica gel. The organosilicate-modified hydrophobic silica gel was dried for 14 hours at 150° C. The yield of dried hydrophobic organosilicate-modified silica gel was 77 g. Physical properties of the dried organosilicate-modified silica gel was determined by the methods described in Example 1 and the results are reported in Table 1.

EXAMPLE 4

An organosilicate-modified silica gel aged at pH 6.8 and hydrophobed with dimethyldichlorosilane was prepared. The neutral-aged organosilicate-modified silica gel was sheared prior to hydrophobing to reduce aggregate particle size and improve the uniformity of the particle size distribution. A solution was prepared comprising 156 ml of PQ N Clear Sodium silicate (PQ Corporation), 70 ml of sodium methyl silicate (DC 722), and 474 ml of deionized water. This solution was added to a rapidly stirred solution comprising 150 ml of concentrated HCl (Fisher Certified) diluted with 150 ml of deionized water to form an organosilicate-modified silica hydrosol comprising 0.063 g of $SiO_2$/ml and 0.017 g of $MeSiO_{3/2}$/ml (Me represents a methyl group). After stirring for an additional 2 to 3 minutes the organosilicate-modified silica hydrosol was poured into flat pans and allowed to gel for about 2 hours. The organosilicate-modified silica hydrogel was cut into 2.5 cm squares and washed with deionized water until the pH of the effluent was about pH 2.2. The washed organosilicate-modified silica hydrogel was placed in a glass container, adjusted to about pH 6.8 by the addition of concentrated ammonium hydroxide, and the resulting mixture aged 44 hours at room temperature.

After neutral aging, the water phase was drained from the organosilicate-modified silica hydrogel and 364 ml of concentrated HCl (Fisher Certified) added. The acidified organosilicate-modified silica hydrogel was placed in a Waring Blender (Model 7011) and sheared for two minutes. The sheared organosilicate-modified silica hydrogel was then placed in a 5 L glass flask and, with stirring, was added 455 ml of isopropanol and 69 ml of dimethyldichlorosilane. After stirring the flask content for 1 hour at room temperature, 1.3 L of toluene were added to the flask. After stirring the flask content for an additional 2 to 3 minutes, stirring was stopped and the aqueous phase drained from the flask. The toluene phase was washed with 0.5 L of deionized water. The flask was fitted with a Dean-Stark trap and the toluene phase refluxed to remove residual water. The toluene phase was evaporated under reduced pressure leaving as product a hydrophobic organosilicate-modified silica gel. The organosilicate-modified hydrophobic silica gel was dried for 14 hours at 150° C. The yield of dried hydrophobic organosilicate-modified silica gel was 92 g. Physical properties of the dried organosilicate-modified silica gel were determined by the methods described in Example 1 and the results are reported in Table 1.

EXAMPLE 5

The dried hydrophobic organosilicate-modified silica gel prepared in Example 1 was compounded into a curable silicone rubber composition, the composition cured, and the physical properties determined. A dried hydrophobic organosilicate-modified silica gel prepared as described in Example 1 was compounded at 38 parts per hundred (pph) into a polydimethylsiloxane gum containing about 0.15 mole percent vinyl radicals substituted on silicon atoms and having a plasticity of about 55 to 65. Into this base composition was blended 0.7 pph of 2,5-bis(tert-butylperoxyl)-2, 5-dimethylhexane, based on the weight of the polydimethylsiloxane gum. The catalyzed base composition was cured in appropriate configurations for physical property testing by hot pressing at 34.5 MPa for 15 minutes at 175° C. The following test methods were used to test the cured silicone rubber: Tensile ASTM D412; Elongation, ASTM D412; 50% Modulus, ASTM D412; 100% Modulus, ASTM D412; Durometer (Shore A), ASTM 2240; Tear (Die B), ASTM D624; Tear (Die C), ASTM D624; and Compression set (22 h at 177° C.), ASTM D395. The results of this testing are reported in Table 1.

TABLE 1

Properties of Neutral-Aged Organosilicate-Modified Silica Gels and Elastomers Prepared Therefrom

| Property | Example Number | | | |
|---|---|---|---|---|
| | 1 | 2 | 3 | 4 |
| BET Surface Area (m²/g) | 701 | 428 | 631 | 440 |
| Void Volume (cm³/g) | 7.15 | 5.82 | 7.73 | 7.27 |
| Pore Volume (cm³/g) | 3.21 | 2.93 | 3.11 | 3.07 |
| Ave. Pore Diameter (Å) | 129 | 185 | 144 | 188 |
| Particle Size (μm) | 47.5 | 84.2 | 42.3 | 68.1 |
| Wt. % Carbon | 14.0 | 12.2 | 10.7 | 12.5 |
| Tensile (MPa) | 8.54 | —* | — | — |
| Elongation (%) | 846 | — | — | — |
| Modulus @50% (MPa) | 0.48 | — | — | — |
| Modulus @100% (MPa) | 0.66 | — | — | — |
| Durometer (Shore A) | 46 | — | — | — |
| Tear Die B (kN/m) | 12.20 | — | — | — |
| Tear Die C (kN/m) | 11.66 | — | — | — |
| Compression Set (%) | 22.6 | — | — | — |

*Indicates data not available

We claim:

1. A method for preparing a neutral-aged hydrophobic organosilicate-modified silica gel comprising:

(A) contacting an organosilicate-modified silica hydrosol comprising (i) about 2 to 50 weight percent of $SiO_2$ per milliliter and (ii) 1 to 50 weight percent of an organosilicate described by formula $R^1SiO_{3/2}$, where $R^1$ is a monovalent hydrocarbon radical comprising about 1 to 6 carbon atoms, with a strong mineral acid at a pH less than about 1 and at a temperature within a range of about 20° C. to 250° C. to form an organosilicate-modified silica hydrogel, (B) aging the organosilicate-modified silica hydrogel at a pH within a range of about pH 3.5 to pH 8 for about 10 minutes to 76 hours, and (C) mixing the organosilicate-modified silica hydrogel with (1) a catalytic amount of a strong acid and (2) an organosilicon compound selected from the group consisting of organosilanes described by formula

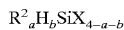

and organosiloxanes described by formula

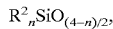

where each $R^2$ is independently selected from a group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive to form a hydrophobic organosilicate-modified silica hydrogel having a surface area within a range of about 100 m$^2$/g to 750 m$^2$/g as measured in the dry state.

2. A method according to claim 1, where $R^1$ is methyl.

3. A method according to claim 1, where the organosilicate-modified silica hydrosol comprises about 5 to 20 weight percent of SiO$_2$ per ml of the hydrosol and about 1 to 20 weight percent of the organosilicate per ml of the hydrosol.

4. A method according to claim 1, where in step (A) the organosilicate-modified silica hydrosol is contacted with the strong mineral acid at a temperature within a range of about 20° C. to 80° C.

5. A method according to claim 1, where in step (A) the organosilicate-modified silica hydrosol is contacted with the strong mineral acid at a temperature within a range of about 20° C. to 50° C.

6. A method according to claim 1, where the aging of step (B) is conducted at a temperature within a range of about 0° C. to 250° C. for a length of time of from about 10 minutes to 76 hours.

7. A method according to claim 1, where the aging of step (B) is conducted at a pH within a range of about pH 6 to pH 7.5 and a temperature within a range of about 20° C. to 150° C. for a length of time within a range of about 1 hour to 24 hours.

8. A method according to claim 1 further comprising shearing the organosilicate-modified silica hydrogel of step (B) prior to conduct of step (C).

9. A method according to claim 1, where in step (C) the catalytic amount of strong acid provides a pH less than about 2.5.

10. A method according to claim 1, where the mixing of step (C) is conducted at a temperature within a range of about 30° C. to 150° C.

11. A method according to claim 1, where the organosilicon compound is an organosiloxane.

12. A method according to claim 11, were the organosiloxane is hexamethyldisiloxane.

13. A method according to claim 1, where the organosilicon compound is an organosilane.

14. A method according to claim 13, where the organosilane is selected from the group consisting of vinyldimethylchlorosilane, vinylmethyldichlorosilane, dimethyldichlorosilane, hexenylmethyldichlorosilane, hexenyldimethylchlorosilane, and bis{3-(triethoxysilyl)propyl}tetrasulfide.

15. A method according to claim 1, where the organosilicon compound provides at least 0.04 organosilyl units per SiO$_2$ unit of the organosilicate-modified silica hydrogel.

16. A method according to claim 1 further comprising contacting the hydrophobic organosilicate-modified silica hydrogel with a water-immiscible organic solvent in sufficient amount to convert the hydrophobic organosilicate-modified silica hydrogel to a hydrophobic organosilicate-modified silica organogel.

17. A method according to claim 1 further comprising during the mixing of step (C) the presence of a surfactant which facilitates reaction of the organosilicon compound with the organosilicate-modified silica hydrogel.

18. A method according to claim 1 further comprising during the mixing of step (C) the presence of a water-miscible solvent which facilitates reaction of the organosilicon compound with the organosilicate-modified silica hydrogel.

19. A method according to claim 1 further comprising mixing the organosilicate-modified hydrogel with an effective amount of a heat stabilizing agent selected from the group consisting of water soluble compounds of cerium and iron.

20. A method according to claim 19, where the water soluble compound is selected from the group consisting of FeCl$_3$ and CeCl$_3$.9H$_2$O.

* * * * *